April 27, 1965 B. E. PECK ETAL 3,181,128

MAGNETIC CORE MEMORY STRUCTURE

Filed Sept. 17, 1959 2 Sheets-Sheet 1

INVENTORS:
Bruce E. Peck
Calvin Fujimoto

By Louis A. Kline
John T. Matlago
Their Attorneys

MAGNETIC CORE MEMORY STRUCTURE

Filed Sept. 17, 1959

INVENTORS:
Bruce E. Peck
Calvin Fujimoto
Louis A. Kline
By John T. Matlago
Their Attorneys United States Patent Office 3,181,128
Patented Apr. 27, 1965

3,181,128
MAGNETIC CORE MEMORY STRUCTURE

Bruce E. Peck, Whittier, and Calvin Fujimoto, Los Angeles, Calif., assignors to The National Cash Register Company, Dayton, Ohio, a corporation of Maryland Filed Sept. 17, 1959, Ser. No. 840,629
5 Claims. (Cl. 340—174)

The present invention is directed to magnetic core memory structures and to methods for making these structures, and more particularly to rugged magnetic core memory structures which are capable of enduring severe environmental conditions and simple and inexpensive procedures for making such structures.

In many instances, magnetic core memories have been found superior to other memories for use in computers, data storage systems and other apparatus having a need for the storage of information and easy access thereto. The magnetic core memory assemblies are made up of a plurality of magnetic storage elements arranged in a geometrical array, and electrical windings which are coupled to the elements in a predetermined manner. Since the magnetic properties of ferrite material are ideal for memory circuits, i.e., the hysteresis characteristic is approximately rectangular, the more common magnetic cores found in magnetic core memory assemblies are made from ferrite material.

A typical magnetic core has a ring-like configuration and is extremely small in size, often having an outside diameter of less than 1/10 of an inch. In many instances, the cores are produced in mass production, employing powdered metallurgy techniques to reduce the cost of individual cores. The mass produced cores are annular or toroidal in shape having sharp annular edges. The ferrite cores take the form of a ceramic material which is extremely hard and brittle and will chip or crack if subjected to stress. The sharp edges and fragile nature of the cores are distinct disadvantages which have limited the effective usefulness of memories employing a magnetic core array. Previously, these limitations and disadvantages of magnetic cores have restricted the use of magnetic core memories to conventional environments in which vibration, shock, heat and humidity are not severe.

Often, the failure of typical magnetic core memories in which the cores are suspended from the winding conductors or wires has been caused by sharp edges of the cores abrading the insulated conductors, in response to vibration of the memory assemblies, producing short circuits. In other instances, severe vibration or acceleration has caused failure of the memory due to chipping or breaking of the cores changing the characteristics of the core or breaking the wires. In order to prevent abrasion of the wires and chipping or cracking of the cores, it is sometimes the practice to clamp the cores by mechanical means or by embedding the cores and windings in a potting compound. The compound hardens to a relatively inelastic and rigid mass which is dimensionally unstable to the extent that it creates pressure on the cores producing a magnetostrictive effect which alters the hysteresis characteristic of the individual cores. A mechanical force produced by either the hardened potting compound or by mechanical clamping means can produce a magnetostrictive effect which alters the hysteresis characteristic producing unreliable signal outputs from the individual cores. Further, the mechanical force may be so great as to cause breaking or chipping of the cores which permanently alters the magnetic characteristics of the cores and their signal outputs, resulting in complete and permanent breakdown of the memory.

Whatever the exact reason is for failure of the magnetic core memories, it is apparent that prior to the present invention, an extremely valuable memory had not been utilized in an important and broad field of mobile applications because of the fragile and sensitive nature of the magnetic cores. In order to overcome the foregoing disadvantages of magnetic cores and provide a magnetic core memory usable in equipment subjected to unfavorable environmental conditions including environments causing severe vibration and acceleration of the memory assemblies, the magnetic core memory structure of the present invention has been developed.

In the preferred arrangement of the present invention, a magnetic core memory has been provided wherein a plurality of spaced annular magnetic cores are disposed in a geometrical array. The memory includes a carrier plate for supporting the cores in spaced relationship in approximately the same plane. When the cores are seated in the carrier, the core apertures provide for a maximum opening in the direction of approach of winding conductors to facilitate threading individual cores of the array in any of a plurality of predetermined orderly patterns with multiple turn windings individual to a core. The cores and windings are embedded in a matrix of cured, soft elastic material surrounding the carrier and dampening the response of the magnetic memory elements to vibration and shock to which the memory may be subjected. Furthermore, the matrix isolates the cores and windings from heat and humidity. In addition, the stiffness as well as the resonant frequency of the memory structure is increased by cover plates provided on the carrier.

An advantage of the present invention is low cost of fabrication since the arrangement of supporting the cores in the assembly permits multiple turn windings to be made easily. Further, the multiple turn windings provide for further system economies by reducing the current requirement of the cores in circuit operations.

It is an object of the present invention therefore, to provide a magnetic core memory having the foregoing features and advantages.

Another object of the invention is to provide a new and useful method of making a magnetic core memory structure.

Still another object is the provision of a magnetic core memory unit capable of safely enduring environmental conditions including heat, humidity and severe vibration and acceleration of the memory structure.

A further object of the present invention is to provide a magnetic core memory in which the annular magnetic cores are disposed for facilitating threading of individual cores.

An additional object of the present invention is to provide a core memory in which annular magnetic cores are supported in a core plane to withstand severe vibration and acceleration.

Still another object of the invention is to provide for the isolation of cores and windings of a magnetic core memory from vibration and shock.

Further objects and features of the invention will be readily apparent to those skilled in the art from the specification and appended drawing illustrating certain preferred embodiments in which:

FIG. 1 is a perspective external view of a preferred embodiment of the invention;

FIG. 1*a* is a detail view of a portion of the structure shown in FIG. 1 from the under surface thereof wherein certain underside portions are broken away to expose the interior thereof;

Figures 1, 1A, 2:
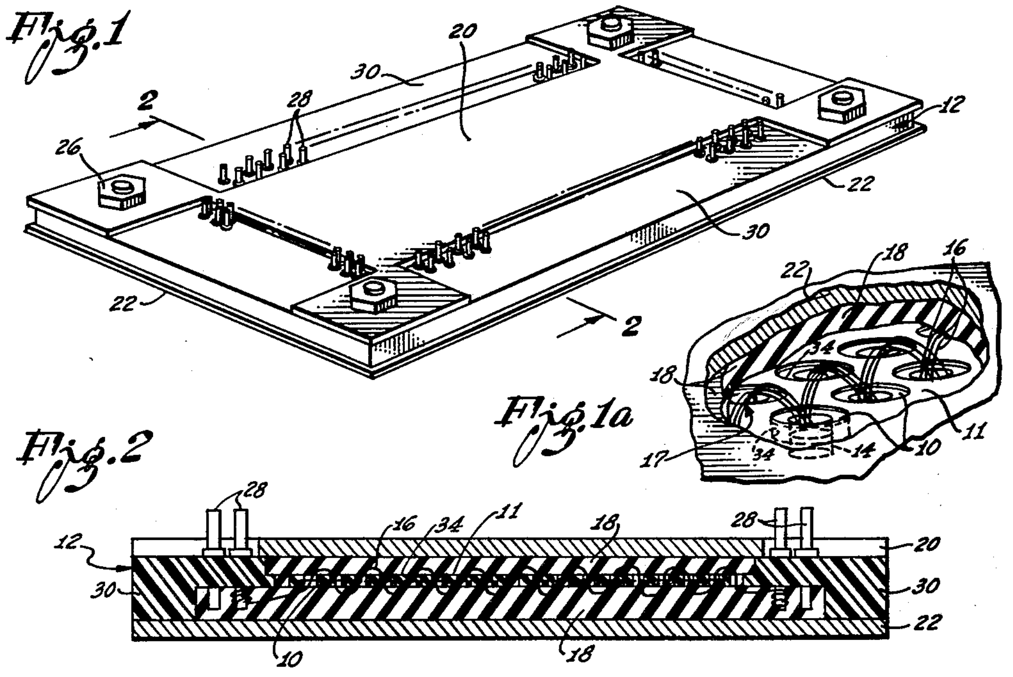
FIG. 2 is a cross sectional view of the structure shown in FIG. 1 taken along the line 2—2 and looking in the direction of the arrows.
Figures 7, 8:
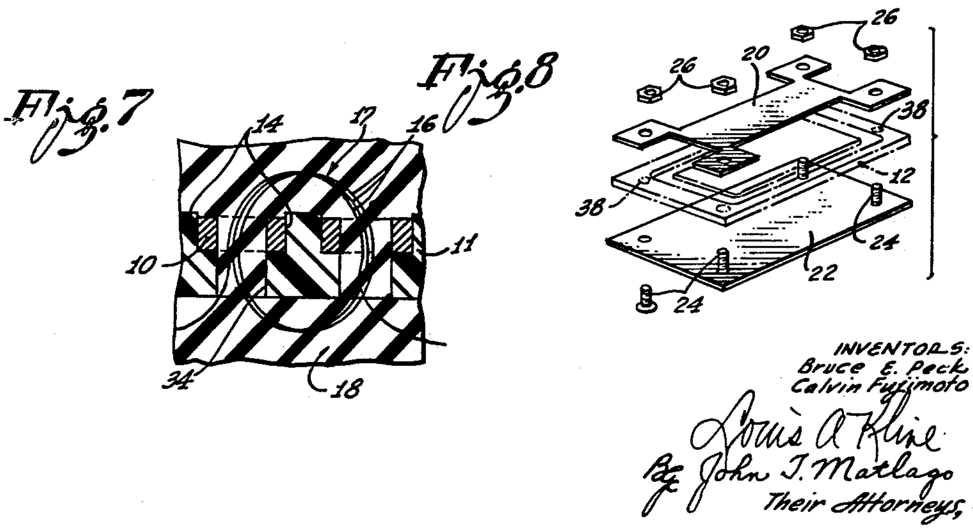
FIG. 7 is a detail view of the structure shown in FIG. 1 showing typical toroidal magnetic cores and a typical winding having a plurality of turns threaded through the apertures of the cores.
FIG. 8 is an exploded view of the structure of the preferred embodiment shown in FIG. 1.

Referring now to the drawings wherein like reference characters designate like or corresponding parts throughout the several views, there is shown in FIGS. 1 and 1*a* which illustrate a preferred embodiment, a rectangular magnetic core memory structure comprising an array of annular or toroidal magnetic cores 10 supported in spaced relationship in a core plane by a core carrier plate 12 comprising a central plate portion 11 having a plurality of spaced annular openings 14 to provide close fitting seats for the cores, and a peripheral flange 30 surrounding the plate portion 11. As illustrated in FIGS. 1*a* and 7, the annular magnetic cores, when seated in the openings 14, are positioned for maximum access to the core aperture for the passage of winding conductors 16 which approach from a direction which is normal to the core plane and the plane of the carrier plate. The winding conductors 16 are readily passed through the same core aperture a plurality of times, by also passing the conductor through an adjacent core or an adjacent opening 14 in the carrier plate 12, to thereby provide core windings 17 having a plurality of turns or multiple turns. The windings illustrated in FIGS. 1*a* and 7 for example, are shown having three turns in each winding.

The array of cores 10 and the winding conductors 16 are resiliently secured in a matrix 18 formed of cured soft elastic material, e.g. silicone materials including silicone rubber or polysiloxane or other elastomeric materials.

Referring now to FIG. 8, cover plates 20 and 22 are shown in alignment prior to being secured to respective sides of the core carrier plate 12 by suitable means; e.g., bonding the opposing surfaces by an adhesive applied to the opposing surfaces of the cover plates. Bolts 24 passing through conjugate holes in the respective corners of the carrier plate and covers, are retained in position by respective nuts 26. A series of memory structures can be disposed in opposing relationship or the structure can be mounted in position by passing elongated supporting members through the corner holes in a manner similar to bolts 24.

In FIGS. 1 and 2, terminals 28 are shown disposed in the peripheral flange 30 of the core carrier plate 12 and about the core array to facilitate connection of the core windings 17 to external apparatus. The terminals 28 are shown as electrically conductive metal dowels having an intermediate shoulder which seats against the upper surface of the peripheral flange. As shown in FIG. 2, the lower portions of the terminals are passed through the flange 30 to provide for internal connections to the winding conductors 16. The lower portions of the terminals are embedded in the elastomeric material of the matrix 18 along with the cores 10 and the winding conductors 16.

Figure 4:
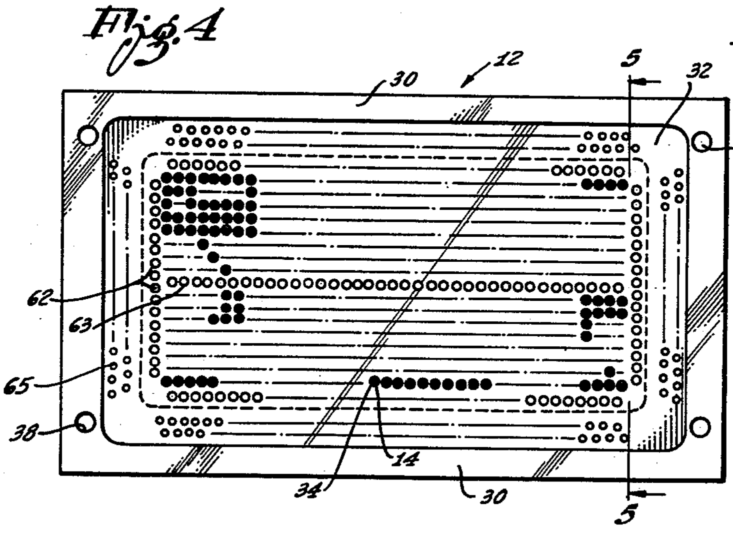
FIG. 4 is a top plan view of a carrier utilized in the structure for supporting the cores of array.
Figure 5:
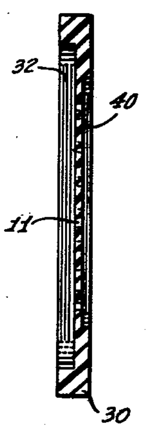
FIG. 5 is a vertical section of the carrier shown in FIG. 4 and taken on the line 5—5.

In the preferred arrangement, the core carrier plate 12, as shown in FIGS. 4 and 5, comprises a rectangular plate formed from rigid, and preferably, insulating material which can be cast or otherwise readily formed, e.g., organic materials; however, the plate could be formed of electrically conductive material which has been coated by an insulator, e.g. aluminum plate which has been hard-anodized. The upper and lower surfaces of the carrier plate 12 with peripheral flange 30 provide recesses to receive the matrix material 18. Larger upper recess 32 extends above the ends of terminals 28. Thus, as shown in FIG. 2, the ends of the terminals are located within the recess whereby the terminal connections are embedded in the elastomeric material forming the matrix 18. The annular openings 14, providing the close fitting seat for the magnetic cores, open into the upper recess 32 whereby the cores may be placed into the openings 14 from the upper side of the plate. A hole 34 is provided at the bottom wall of each opening for the passage of the winding conductors passing through the core apertures and through the plate.

The peripheral area adjacent the core array is perforated to accommodate the shanks of the terminals 28, the lower portions of which pass through the carrier plate 12. The outer periphery of the flange 30 is provided with holes 38 for the passage of the bolts 24 or other means as stated supra. As shown in FIGS. 4 and 5 lower recess 40, formed by peripheral flange 30, accommodates the winding conductors within the core plate whereby the matrix 18 filling the recess will embed the conductors in the soft elastic material to resiliently secure them from relative movement due to vibration, shock or the like.

Figure 6:
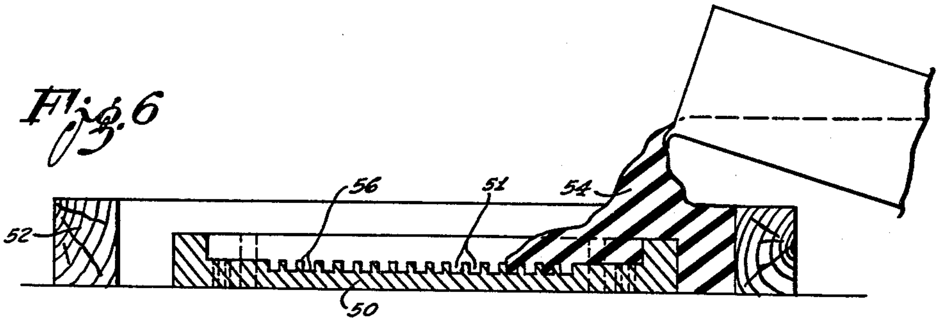
FIG. 6 is a diagrammatic view, partly in vertical section, of apparatus utilized in the preferred method of forming the mold shown in FIG. 3.

The carrier plate 12, which is provided for supporting the magnetic memory core in the core structure, is produced by first forming a master carrier plate 50, shown in FIG. 6. The master carrier plate is similar in shape to the cast carrier plate shown in FIGS. 4 and 5. Preferably, the master carrier plate is formed from a rigid material, such as an easily machined metal, and includes an array of counterbores which are disposed in a pattern arrangement identical to the annular openings 14, and other openings in the carrier plate 12.

Figure 3:
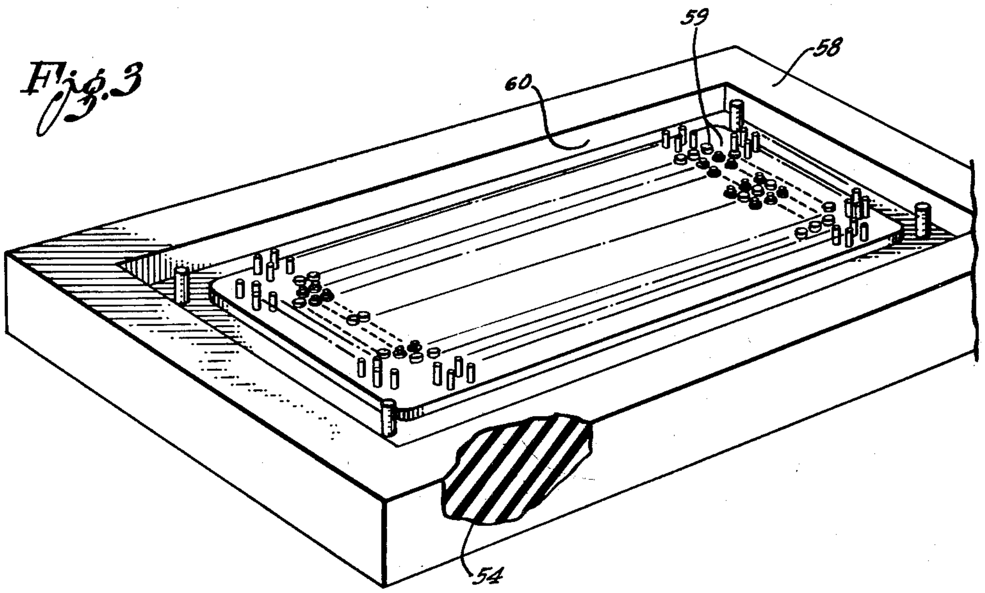
FIG. 3 is a perspective view of a mold including a negative replica of a carrier for supporting magnetic cores in the structure shown in FIG. 1.

The process for producing carrier plates 12 from the master carrier plate 50, is illustrated in FIG. 6, which shows a cross section of the master plate 50 which, with the exception of recess 40, has the identical shape as the cross section of the carrier plate 12, shown in FIG. 4. Openings 51, for example, in master plate 50 correspond to holes 62 in plate 12. This process includes the steps of placing the master, facing upwardly, in an open receptacle or box form 52 and applying or pouring an uncured elastic material 54, such as silicone material, over the exposed surfaces 56. After the elastic material 54 envelopes or covers the entire upper surfaces of the master carrier plate 50, the material is allowed to cure or set. Once the material has set, a cured mold such as the mold 58, shown in FIG. 3, is separated from the master carrier plate. This mold 58 has a negative replica of the master carrier formed in its cavity 60. The next step in making the carrier plate 12 is to apply a material such as polymerized acrylic resin, into cavity 60 over the exposed surfaces 59. After this resin material envelops or covers the entire surfaces of the mold 58, the material is allowed to cure or set, after which this completed carrier plate 12 is removed. This mold 58 can be used to form many carrier plates 12 by filling the cavity 60 with uncured material and, after curing, removing the rigid casting so formed from the cavity 60. After removal, lower recess 40 is then machined on the cast carrier plate.

Referring to FIGS. 4 and 5 once more, holes 62 are shown to have been formed in the cast carrier plate 12 to connect the upper and lower recesses 32 and 40. Peripheral openings 62 and intermediate openings 63 provide convenient access for the winding conductors 16 to either side of the carrier plate whereby the cores can be wound in the proper direction to provide a desired polarity of the winding on the individual cores.

The magnetic memory core assembly is constructed to provide maximum access to the core apertures during winding of the cores 10 which are positioned in the openings 14 in the carrier plate 12. To this end, the cores, as shown in FIG. 1*a*, are positioned with the apertures in the plane of the carrier plate 12. In the preferred arrangement, blocking of the core apertures by the winding conductors 16, which would normally lie diagonally in the core aperture, is minimized by returning the conductors laterally in the same general direction, if necessary, after passage through a core aperture by passing the conductor through a hole 62 located in the return direction. Thus, the conductors will lie flat against the inner periphery of the core. As stated supra, the holes 62, shown in FIG. 4, also provide for passing the conductors to the side of the plate 12 for winding the cores in the proper direction to provide the desired polarity of the core windings on the individual cores.

In the assembly of the magnetic memory core structure, the annular magnetic cores 10, shown in FIG. 1*a*, are seated in the openings 14 and the conductors 16 are threaded through the core apertures and holes in the carrier plate in a predetermined sequence to provide core windings which are interconnected in a desired manner for the magnetic core array. The ends of the conductors are connected to the terminals 28 which extend through the core plate 12 to provide external input and output connections. The matrix 18 is formed subsequently by embedding the cores and windings in a soft elastic material and closing off the upper and lower recesses 32 and 40, e.g., by the cover plates 20 and 22, as shown in FIG. 2. In the preferred process, special plates are used to close off the recesses 32 and 40 during the forming of the matrix which is accomplished by forcing an uncured soft elastic material into the recess 32 through an aperture in the special cover plate similar to plate 22. If the uncured matrix material is injected with adequate pressure, it will surround the cores and windings and pass through the core aperture and holes in the carrier plate 12 and also fill the recess 40. Upon the curing of this material, a soft elastic matrix is formed for resiliently supporting the cores and coil winding conductors. The special plates used to close off the recesses 32 and 40 during the forming of the matrix are removed after the material sets. Subsequently, cover plates 20 and 22 are bonded to the opposing portions of the carrier plate and matrix by a suitable adhesive. The bolts 24, which are shown passing through the corresponding holes in the cover plates and carrier plate, could be used as permanent retaining means if rods or other elongated support means are not utilized to mount the memory structure along with other memory structure in a siutable enclosure.

In the preferred arrangement of the memory structure, as illustrated in FIGS. 1*a*, 2 and 7, the material forming the matrix 18 fills all the recesses or cavities between the cover plates 20 and 22 in addition to merely surrounding the cores 10 and conductors 16. In an alternate arrangement, the matrix is formed from two or more materials. The soft elastic material is applied to the carrier cores and wires and surrounds substantially only the cores and wires and an organic foam is applied over the cured soft elastic material, filling the recesses 32 and 40 in the carrier. After the organic foam, e.g. polyurethane, has hardened, it acts to inhibit relative movement of the cores and wires and central area of the carrier plate relative to the peripheral flange in response to vibration and shock. For the more severe environmental conditions, the construction found in the alternate arrangement provides additional protection to the memory elements and windings, although the preferred and more economical construction of the preferred arrangement has been found satisfactory.

In the light of the above teachings, various modification and variations of the present invention are contemplated and are apparent to those skilled in the art without departing from the spirit and scope of the invention.

What is claimed is:

1. An electrical circuit structure comprising in combination: electrical circuit means including ferrite cores; substantially rigid carrier means comprising a pre-formed casing having a raised peripheral area defining a recessed central portion supporting said circuit means which are surrounded by said raised peripheral area, and openings in said central portion for receiving said ferrite cores in a predetermined arrangement therein; resilient means comprising a mass of substantially continuous elastomeric material, said casing providing a mold for casting said elastomeric material wherein said entire central recessed portion is covered to completely envelop said circuit means in said recessed central portion; a rigid cover plate secured to said peripheral area to completely enclose said recessed central portion; and a stiff organic foam disposed in said recess above said central portion between the cover plate and the elastomeric material enveloping said circuit means.

2. A magnetic core array structure comprising in combination: electrical circuit means including ferrite cores, electrical terminals, and winding conductors threading said cores and connected to said terminals; substantially rigid carrier means comprising a carrier plate having a recessed central portion for supporting said circuit means and a peripheral flange forming a recess in said carrier plate above said central portion, an array of apertures formed in said central portion including apertures for receiving said ferrite cores in the carrier plate and said winding conductors threading said cores in a predetermined arrangement therein, and peripheral apertures formed about the periphery of said recessed central portion for receiving and passing portions of said terminals which project into said recess for connection to said winding conductors; and a matrix comprising a mass of substantially continuous elastomeric material filling said recess, said carrier plate providing a mold for casting said elastomeric material wherein the entire recessed central portion of the carrier plate is covered by said material to completely envelope and embed said cores, said winding conductors and said portions of said terminals that project into said recess.

3. A magnetic core memory array structure comprising in combination: circuit means including toroidal cores, conductor windings, and terminals for said windings; rigid carrier means comprising a pre-formed casing having a recessed central portion surrounded by a thick peripheral flange to form both top and bottom recesses in said casing for casting a mass of elastomeric material to embed said circuit means therein, said central portion of said casing having openings including counterbores for seating said cores and supporting the cores in said central area during threading of said conductor windings through apertures in said toroidal cores, and a row of openings in said casing about the periphery of said central portion, said terminals for said windings being seated in said row of openings and having lower portions thereof projecting into said bottom recess for connection to said windings; and a soft, resilient matrix comprising said elastomeric material cast in said top and bottom recesses to fill said recesses with said material, cover over both sides of said central portion to engage both surfaces thereof, and fill said core apertures to embed said cores, said windings and said lower portions of said terminals for resiliently securing said cores, windings and terminals in said matrix and casing.

4. A magnetic core array structure comprising in combination: circuit means including ferrite cores, windings threading said cores, and terminals for said windings; substantially rigid carrier means comprising a pre-formed casing having a raised peripheral area defining a central recess and a recessed central portion having openings for seating and supporting said cores in a predetermined arrangement therein during threading by said windings, and openings for passing portions of said terminals into said central recess and supporting said terminals for connection to said windings; and resilient means comprising a mass of continuous elastomeric material, said casing providing a mold for casting said elastomeric material wherein said entire recessed central portion of the casing is covered by said elastomeric material and all spaces between said circuit means are filled with said material to completely surround and resiliently secure said circuit means in said material.

5. A magnetic core array structure comprising in combination: circuit means including ferrite cores and winding conductors threading said cores; substantially rigid carrier means comprising a casing having a recessed central portion for supporting said circuit means and a peripheral flange defining a central recess above said central portion, and a geometric array of apertures formed in said central portion including apertures for receiving said ferrite cores in the carrier plate and passing said winding conductors threading said cores in a predetermined arrangement therein; and a soft, elastic matrix comprising a mass of substantially continuous elastomeric material filling said central recess, said casing providing a mold for casting said elastomeric material wherein said entire recessed central portion of the casing is covered by said elastomeric material to completely envelop and embed said circuit means in said material.

References Cited by the Examiner

UNITED STATES PATENTS

| | | | |
|---|---|---|---|
| 2,824,294 | 2/58 | Saltz | 340—174 |
| 2,829,426 | 4/58 | Franklin | 29—155.5 |
| 2,864,057 | 12/58 | Connelly et al. | 324—156 |
| 2,875,409 | 2/59 | Lamb et al. | 324—156 |
| 2,877,540 | 3/59 | Austen | 29—155.5 |
| 2,878,463 | 3/59 | Austen | 340—174 |
| 2,901,736 | 8/59 | Sylvester | 340—174 |
| 2,910,673 | 10/59 | Bloch et al. | 340—174 |
| 2,910,675 | 10/59 | Gessner | 340—174 |
| 2,945,215 | 7/60 | Sprude | 340—174 |
| 2,970,296 | 1/61 | Horton | 340—174 |
| 3,068,554 | 12/62 | Pouget | 340—174 |

IRVING L. SRAGOW, *Primary Examiner.*

EVERETT R. REYNOLDS, STEPHEN W. CAPELLI, *Examiners.*